Jan. 14, 1936.  W. B. FAGEOL  2,027,684
PNEUMATIC TIRE COMBINATION RAIL AND HIGHWAY UNIT
Filed May 26, 1932  2 Sheets-Sheet 1
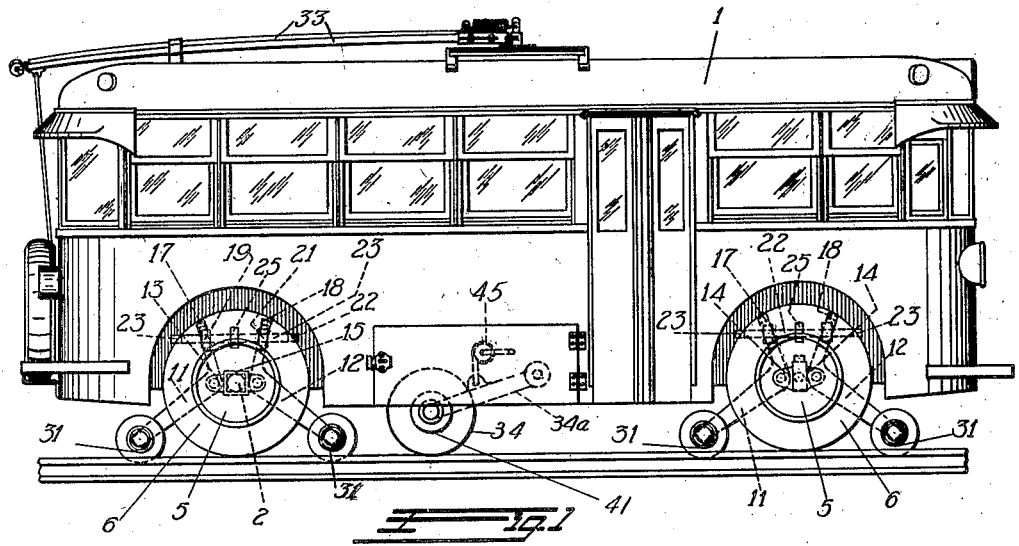
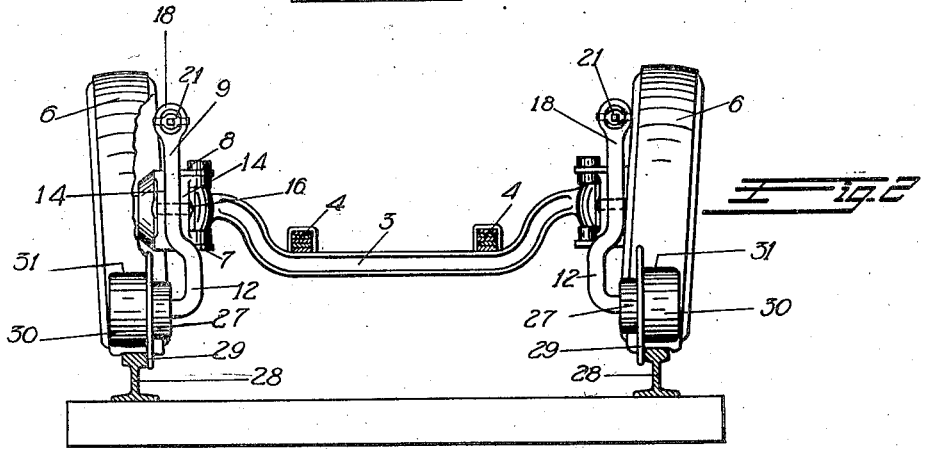
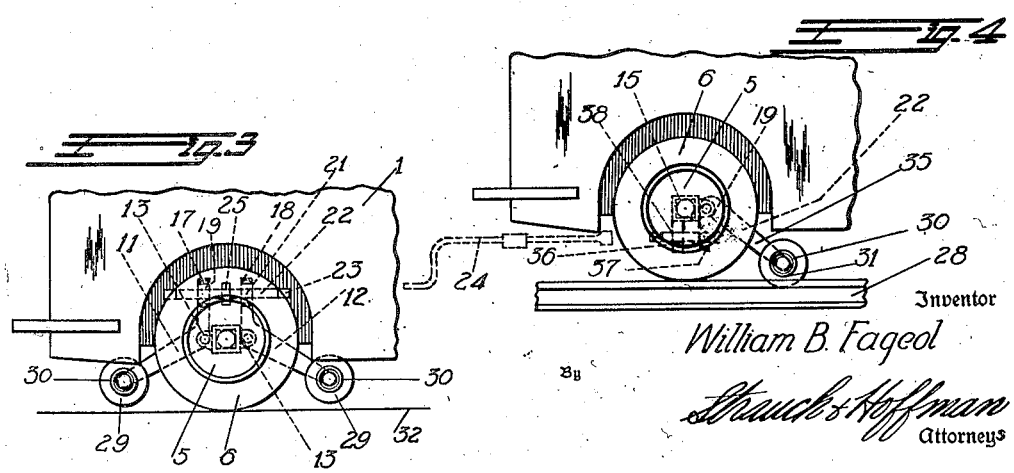
Inventor
William B. Fageol
Strauch & Hoffman
Attorneys Jan. 14, 1936.  W. B. FAGEOL  2,027,684
PNEUMATIC TIRE COMBINATION RAIL AND HIGHWAY UNIT
Filed May 26, 1932  2 Sheets-Sheet 2
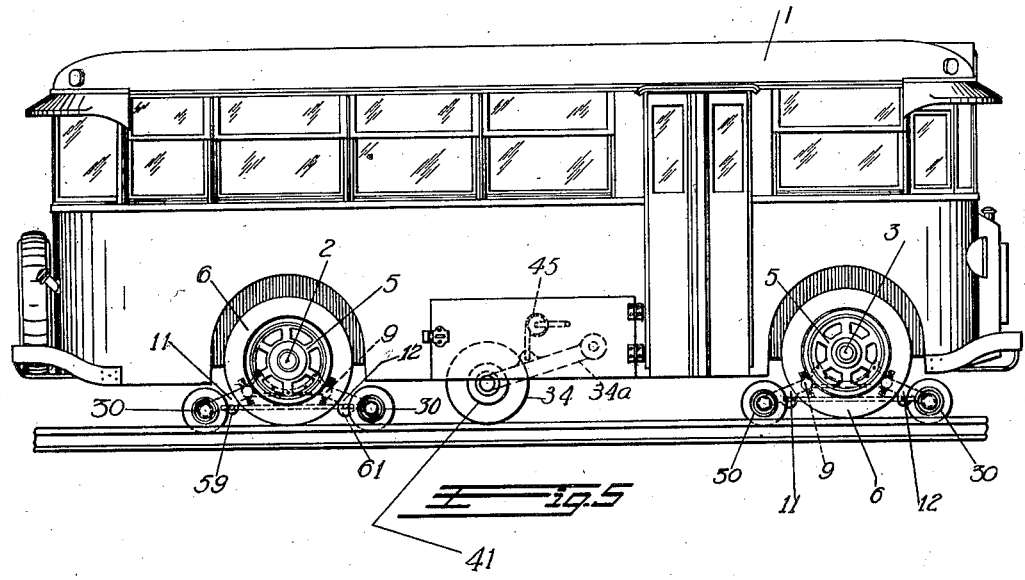
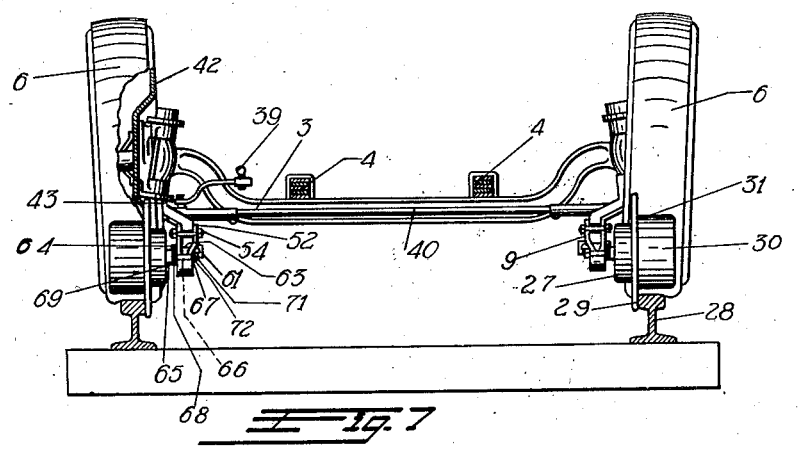
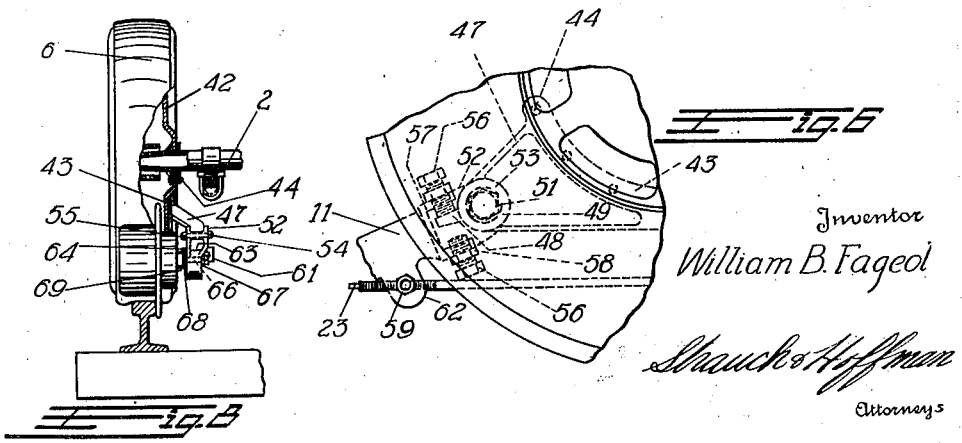
Inventor
William B. Fageol
Shauck & Hoffman
Attorneys Patented Jan. 14, 1936

2,027,684

UNITED STATES PATENT OFFICE 2,027,684

PNEUMATIC TIRE COMBINATION RAIL AND HIGHWAY UNIT

William B. Fageol, Kent, Ohio, assignor to Twin Coach Company, Kent, Ohio, a corporation of Delaware Application May 26, 1932, Serial No. 613,751

3 Claims. (Cl. 105—215)

This invention relates to highway and rail vehicles and is concerned more particularly with apparatus to be used with a highway and rail vehicle so that it may be operated at will over railroad tracks or highways by any form of motive power such as internal combustion engine, engine-electric or electric power derived from a storage battery or external source, on road wheels provided with resilient tires.

Freight and passenger rail transportation has been hampered by excessive cost of operation for heavy units or trains of such units. Because of high fixed charges and initial cost it has been impracticable to furnish the frequent service necessary to compete with other modes of travel. Transportation to and from the point of origin or destination of the journey to the railway facilities has further complicated the problem and introduced the factor of highway competition, the journey in most cases being completed from origin to destination by highway to avoid transfer to and from rail units or trains. While it has been proposed to modify the wheels of existing highway vehicles to receive flanges to be bolted on concentrically with and beside the tire for guiding contact with the gauge side of the rail head, it is obvious that such an arrangement limits the width of the tire which may be applied to the wheel, since the guiding means must lie entirely beyond any plane passing through the tire perpendicular to its axis. This limitation in tire width has its most serious effect in reduction of allowable load per tire. It has been demonstrated that even with careful design, special narrow tires for the foregoing development have a total load carrying capacity per tire of only about 1700 pounds when operating on track rails. With present day vehicle loads even with light carefully designed vehicle bodies it is necessary to provide a plurality of narrow tired wheels in groups and so modify the vehicle that highway operation is impossible.

With my invention, frequent service in light, comfortable, safe and even luxurious units of low initial cost and operating expense is made possible for a small fraction of the expenditure necessary for infrequent rail transportation by the present equipment and methods with the important advantage of transportation in one unit without transfer from the point of origin to final destination.

The importance of the latter advantage of the invention may be realized by a consideration of the possibilities of door to door pick up and delivery of passengers or freight. Interurban rail transportation may be furnished between metropolitan centers without congestion of highways by mass transportation units, my invention permitting use of existing rail facilities for rapid and safe travel after the load or a portion thereof has been taken by street and highway travel from door to door of the residences of prospective passengers or from warehouses widely scattered over a local area. Delivery at the final destination may also be effected by street and highway travel in accordance with the foregoing practice.

By use of my invention fast, clean, frequent and comfortable service may be given on branch lines of steam railways which have been heretofore operated at a loss with heavy steam equipment or heavy self propelled units confined to rail operation between stations which are in most cases inconveniently located for the traveling public.

The highway-rail vehicle of my invention to fulfill the demand for safe and rapid travel on highways or rails, makes use of resilient tires in a novel and efficient manner for highway and rail operation with little or no alteration of the vehicle to practice my invention and with the minimum of manipulation to change from road to rail operation or vice versa. A vehicle equipped with the pneumatic tires used in highway service may be operated safely over rails by my novel invention, each tire having a load supporting capacity when rolling on the rails of a track comparable to its capacity in road service. Tires of the conventional form provided with a tread composition having a high uniform coefficient of friction in engagement with track rails under all conditions of wet or dry weather may be advantageously used in practicing my invention. High speeds may be attained in safety without regard to weather conditions in operation over highways or rails. Accidental deflation of the tire from any cause such as punctures or blowouts will not prevent safe operation on tracks until the tire can be repaired and inflated. The vehicle of my invention may be operated safely on tracks with one or more tires completely or partially deflated. In highway operation, the vehicle may be moved to a convenient repair station by using the novel means constituting a part of my invention in engagement with the road surface to support the vehicle axle at the defective tire, driving force being supplied through the remaining undamaged tire or tires. In the event of failure of a tire on a driving axle, emergency operation may be had if the vehicle is of the type having individual wheel drive. With conventional differential driving arrangements it is merely necessary to check rotation of the wheel having the defective tire for emergency operation.

My invention contemplates operation of vehicles over highways or tracks on pneumatic tires by electric propulsion, electrical energy being furnished from a storage battery or from an external source of electrical energy supplied by contact devices for cooperation with either overhead or "third rail" conductors, the return circuit for propulsion current being completed through the rails by novel means forming a part of my present invention.

If desired the arrangements disclosed and claimed in my copending application Serial Number 489,208 filed October 16, 1930 may be adapted for return of propulsion current or for operation of signals by track circuit control.

Operation of existing roadside signals by customary track circuits may be had by the track engaging means provided as part of my invention.

Accordingly, a primary object of my present invention is to provide simple and effective means for the safe and efficient and silent operation of resiliently tired vehicles alternatively on railway tracks or highways, the change necessary to adapt the apparatus for either mode of travel being confined to simple manipulation of the apparatus.

A further object of my present invention is to provide simple effective means for safe, efficient and silent operation of resiliently tired vehicles alternatively on railway tracks or highways by electric motive power derived from storage batteries or from an external source propulsion current return means being provided by the novel means of my invention at high speeds with safety and quietness.

A still further object of my invention is to provide novel and effective means for operation of track circuit signals, track circuit interlocking signals and plants, and train stop and control apparatus operated from track circuits by a novel rail contact of my invention.

A still further object of the present invention is to provide means for guiding the resiliently tired driving and trailing wheels of a vehicle along a railway track at any desired speed with safety around curves of long or short radius and through switches, crossings, and other special track work.

Another object of the present invention is to provide means for guiding and steering the resiliently tired wheels of a vehicle along a railway track at any desired speed with safety around curves of long or short radius and through switches, crossings, and other special track work.

Still another object of the present invention is to provide a simple and effective attachment for a pneumatic tired road vehicle to guide it along a railway track at high speeds comprised of guiding means which may be readily raised or lowered from or into guiding contact with the rails.

A further object of the present invention is to provide a simple and effective attachment for a pneumatic tired road vehicle to guide and steer it along a railway track at high speeds comprising guiding and steering means which may be readily raised or lowered from or into guiding and steer-contact with the rails.

A still further object of the present invention is to provide a simple and effective attachment for a pneumatic tired road vehicle whereby emergency operation of the vehicle may be had in the event of failure of one or more pneumatic tires.

A still further object of the present invention is to provide a simple and effective attachment for steering and guiding a pneumatic tired road vehicle on railway track at high speeds with the pneumatic tire or tires partially or wholly deflated accidentally or otherwise.

A still further object of the present invention is to provide a simple and effective attachment for emergency operation of a pneumatic tired road vehicle on highways with the pneumatic tire or tires partially or wholly deflated accidentally or otherwise.

Further objects of my invention will appear in the following disclosure of my preferred methods and apparatus and are defined by the terms of the appended claims.

In the drawings:

Figure 1 is a side elevational view of one embodiment of the improved highway and rail vehicle of my invention showing the guiding means thereof in rail guiding positions and illustrates instrumentalities for electrical operation of the vehicle and track signal control.

Figure 2 is a fragmentary view in elevation of the embodiment shown in Figure 1 on a larger scale, parts being broken away to show certain detailed portions.

Figure 3 is a fragmentary view of the vehicle corresponding to Figure 1 showing the guiding means thereof in retracted position for highway operation.

Figure 4 is a fragmentary elevational view similar to Figure 1 of a slightly modified embodiment of the vehicle of my invention.

Figure 5 is a side elevational view similar to Figure 1 of a further slightly modified embodiment of my invention.

Figure 6 is a fragmentary view of a portion of Figure 5 on an enlarged scale to show certain detailed portions.

Figure 7 is a fragmentary rear view in elevation similar to Figure 2 on an enlarged scale of the forward portion of Figure 5.

Figure 8 is a fragmentary view in elevation similar to Figure 2 on an enlarged scale of the rear portion of Figure 5.

The invention will be hereinafter described as applied to a vehicle, passenger or freight, provided with the necessary means of propulsion, as for example, an internal combustion engine or engines or electric motors and suitable current collecting means for example, trolleys, to provide for current collection and return, and suitable instrumentalities for transmission of the power thereof to the drive wheels for operation on highways in the usual manner. For electrical operation on rails of existing tracks one only of the trolleys need be used, current return being provided if desired by the novel means herein described or by the means disclosed in my co-pending application mentioned hereinbefore.

While I have chosen to illustrate my invention in connection with a road vehicle of special light construction embodying a base frame and a box-like body with continuous passenger space from front to rear, it is to be understood that the invention may be effectively practiced with a road or rail vehicle of any desired type.

Referring to the drawings in detail, and particularly Figures 1 to 3 thereof, numeral 1 indicates a road vehicle provided with axles 2 and 3. For the purpose of illustrating my invention axle 2 is shown as a driving axle and axle 3 as a "dead"

axle. Resilient means for example springs 4, support vehicle 1 on axles 2 and 3 to compensate for unevenness in the rolling surface and to prevent transmission of shocks caused thereby to vehicle 1. Axles 2 and 3 carry road wheels 5 provided with resilient tires 6. Tires 6 to obtain the full benefit of alternative highway and rail operation are preferably of the low pressure pneumatic type provided with a tread composition having a high coefficient of friction in contact with a wet or dry rolling surface. However, it is to be understood that any type of resilient tire may be used on wheels 5. One pair of wheels 5, for example those on forward axle 3 are dirigibly mounted for the purpose of steering vehicle 1, by suitable means, as for example knuckle 7 and kingpin 8. A conventional steering gear (not shown) is or may be provided for wheels 5 of axle 3 the desirability of which for rail use is dictated by considerations such as degree of curvature of track curves to be encountered. For highway and rail operation, use of a conventional steering gear is contemplated.

For alternative operation on highways or rails, retractable means indicated generally by reference character 9 are provided to cooperate with each of wheels 5 in the novel manner to be fully described hereinafter. Retractable means 9 comprising members 11 and 12 positioned to the rear and forwardly of wheels 5, are suitably mounted to cooperate with wheels 5 on axle 2.

Members 11 and 12 are connected at appropriate points to vehicle 1 by suitable means as for example ears or lugs 13 and 14. Lugs 13 for axle 2 are or may be if desired, formed on squared portions 15 of axle 2. Suitable means as for example pins 16 may be employed to pivotally retain members 11 and 12 between lugs 13 or 14. Members 11 and 12 may extend beyond their point of connection 16, the extensions being indicated by reference characters 17 and 18 respectively. As shown in Figures 1 to 3 extensions 17 and 18 are continued upwardly. It is to be understood that extensions 17 and 18, may if desired, be separate elements operatively joined to members 11 and 12, and may if desired, be extended beneath their respective axles for manipulation in a manner to be hereinafter described. I have chosen to illustrate one embodiment of the invention in Figures 1 to 3 in which extensions 17 and 18 are provided with threaded trunnions 19 and 21 respectively to receive the threaded ends of rod 22. Each end of rod 22 is provided with threads of opposite pitch. Trunnions 19 and 21 have oppositely threaded bores to cooperate with the threaded portions of rod 22 so that upon turning of rod 22 extensions 17 and 18 are drawn together or spread apart in accordance with rotation in either direction of rod 22 for a purpose to be hereinafter described. Rods 22 are provided with suitable means, for example squared end 23, for engagement with a suitable tool as for example the common form of wrench or the usual folding jack handle wrench 24 indicated by broken lines opposite Figure 4 of the drawings, either of which are generally available in the tool equipment of a vehicle. Rods 22 may be guided by a slotted member 25 suitably connected to axle 2 to prevent possible lateral movements of 17 and 18. A like member 25 is provided for connection to knuckle 7.

Members 11 and 12 for cooperation with wheels 5 of axle 3 are mounted in a manner similar to that just described for axle 2.

The mounting of members 11 and 12 for cooperation with wheels 5 of axle 3 is best illustrated in Figure 2. Ears or lugs 14 may be formed if desired on knuckle 7. Pins or rivets 16 pivotally retain members 11 and 12 between lugs 14. Members 11 and 12 mounted as illustrated by the accompanying drawings and described herein are interchangeable to cooperate with any one of wheels 5, to thus reduce cost. Members 11 and 12 together with extensions 17 and 18 and rod 22 may thus move with knuckles 7 and wheels 5 and in accordance with controlling forces applied to members 11 and 12 in a manner about to be described.

Each member 11 and 12 carries suitable means preferably wheels 27 mounted thereon by suitable antifriction bearings, for cooperation with one rail of track rails 28. Wheels 27 and their relation to track rails 28 are clearly illustrated in Figures 1 and 2. Wheels 27 are provided with a flange 29 and a body portion 30. Body portion 30 is provided with a substantially flat tread 31. As illustrated in Figures 1, 2, and 4 of the drawings, during normal operation of vehicle 1 on track rails 28 tread 31 is held just above rail 28 so that tread 31 is out of contact with rail 28. This adjustment is obtained by manipulation of rod 22. Flange 29, however, extends downwardly in guiding contact with the side of rail 28. Wheels 27 of members 11 and 12 associated with axle 3 may, if desired, impart both steering and guiding forces to knuckles 7 and wheels 5. Wheels 5 of both axles are thereby constrained to follow the direction of track 28 regardless of irregularities, and curves of short radius are negotiated at high speeds with safety and absence from side sway or unsteadiness.

For operation of the vehicle of my invention on highways by electric motive power means, suitable means for current collection may be provided for cooperation with existing supply conductors, for example trolleys 33, one of which may be utilized for contact with a positive conductor, the remaining trolley being in contact with the return conductor.

For operation of the vehicle of my invention on tracks by electric motive power one of trolleys 33 may be utilized for contact with an overhead conductor. It is to be understood that suitable contact means, for example a shoe of any well known construction, may be utilized for contact with a roadside conductor or "third rail". Novel contact means 34 for cooperation with rails 28 comprise wheels 34 of relatively large diameter and of relatively light construction. Wheels 34 are carried on arms 34a pivoted on the vehicle so that wheel 34 may be raised from contact with the rail and so that it may roll in intimate contact with the rail regardless of undulations of the vehicle. It is to be understood that wheels 34 are of sufficient width to maintain contact with rails 28 on curves of any radius which may be negotiated by vehicle 1. Wheels 34 are provided with rubber insulation 41 at the hubs to insure quietness of operation. Mechanism, for example, reel and cable 45, is illustrated for raising wheels 34 from contact with the rails for operation of the vehicle on highways. Wheels 34 may be advantageously used for contact with the rails of street railways. A path for electric current return may be provided around insulation 41 including arm 34a and the vehicle as part of the electrical propulsion circuit at the electrical potential of the rails. If desired, wheels 34 may be connected by insulated conductors (not shown) directly to the propulsion and control circuits of the vehicle.

Wheels 34 may if desired, be utilized to control wayside block signals or track circuit controlled interlocking plants by track circuits in the customary manner. Special circuits for operation of train stop or train control apparatus of the continuous type may be had by insulating selected ones of wheels 34 in accordance with circuit requirements of the special control or signal apparatus provided for the track to be traversed. If desired selected ones of wheels 34 may be insulated to serve as signal circuit contacts while others serve as grounding connections for propulsion current. Grounding means may be provided in accordance with the disclosure of my co-pending application mentioned hereinbefore.

As has been observed treads 31 of wheels 27 do not normally contact with the rails. Quietness of operation is assured thereby as the resilient tires 6 carry the full load upon the vehicle axles. Contact pressure between rails 28 and flanges 29 being sufficient only for guiding purposes, little or no noise is noticeable. Preferably flanges 29 contact with rails 28 intermittently for guiding purposes only when guiding is necessary, thus insuring long life for guide wheels 28 and flanges 29 and adding to quietness of operation.

The width of tires 6 is substantially unlimited laterally when my novel means are used for rail operation of the vehicle I whereby tires of high load carrying capacity and great resilience may be used. All of the advantages of modern tires inflated to very low normal pressures may be realized. The guiding means of my invention may lie in a plane passing through the tires perpendicular to their axes and therefore tires of extreme widths and extremely low normal pressures may be used.

In the event of partial or complete deflation of one or more of tires 5 during operation of the vehicle of my invention on rails 28, treads 31 of wheels 27 come into partial or full load carrying contact with rails 28 to safely support and guide the vehicle at the highest running speeds which may be attained. Operation may be continued with wheels 27 in load carrying contact to convenient tire repair facilities. Wheels 27 of members 11 and 12 may cooperate to raise associated wheels 5 free of the running surface for the purpose of changes or repairs to wheel 5 or tire 6.

Figure 3 illustrates the relative position of the elements hereinbefore described when the vehicle of my invention is operated on highways or streets. The surface of a highway or road is indicated by reference character 32. As illustrated in this figure, members 11 and 12 have been adjusted so that flanges 29 clear road surface 32 under conditions of maximum deflection of tires 6 by manipulation of rod 22, whereby vehicle I may be operated in the conventional manner over highways or streets. Emergency operation in the event of failure of one or more of tires 6 may be had by adjusting members 11 and 12 so that the tread surface of the defective tire or tires is just clear of road surface 32.

In Figure 4 is shown a slightly modified embodiment of my invention. Referring to this figure it will be seen that members 35 provided with wheels 27 correspond to members 11 and 12 of the embodiment illustrated in Figures 1, 2, and 3. Members 35, if desired, may be pivotally mounted from ears 13 provided on squared portions 15 of axle 2 as described in connection with members 11 and 12. Squared sections 15 of axle 2 are provided with means to receive adjusting rods 22 in the form of lugs or projections 36, provided with an internally threaded aperture 38. Extensions 37 of members 35 extend downwardly opposite lugs 36. Extensions 37 are provided with a trunnion 19 having threads of opposite pitch to those of aperture 38. Rods 22 are received in aperture 38 and trunnion 19, whereby members 35 and wheels 30 may be moved to and from guiding engagement with rails 28. Contact wheels 34 are illustrated which may be used for signal control by track circuits.

Operation of the embodiment disclosed in Figure 4 is similar to that described in connection with Figures 1, 2, and 3. During normal operation of vehicle I on track rails 28 the treads 31 of wheels 30 are out of contact with rail 28. Flanges 29 engage the rail for guiding contact therewith. The weight of vehicle I on axle 2 is carried as before on tires 6. In the event of tire failure, treads 31 of wheels 30 come into contact with the rail to carry the wheel load, the reaction being taken by axle 2 through members 37, 22, and 36. As has been pointed out in connection with Figure 3 for operation on highways or streets, members 22 are manipulated to adjust members 35 to a position such that flanges 29 of wheels 27 are clear of rolling surface 32 when maximum deflection of tires 6 is experienced. Emergency operation with one or more of tires 6 deflated may be had by adjustment of member 35 so that flange 29 of associated wheel 30 bears the axle load normally carried by wheel 5 and inflated tire 6.

A further slightly modified embodiment of my invention is shown in Figures 5, 6, 7, and 8. Referring to these figures in detail it will be seen that reference numeral 1 indicates a vehicle similar to vehicle I of Figure 1, provided with axles 2 and 3 as was described hereinbefore in connection with Figures 1 to 4, road wheels 5 and tires 6. Figure 7 is a rear view of axle 3 and its associated parts including a conventional steering connection 39 and link 40. Guide means 9 comprising members 11 and 12 provided with guide wheels 27 correspond to members 11 and 12 of the embodiment illustrated in Figures 1 to 3. Members 11 and 12 are supported from the vehicle in the following manner: Brake drum housings 42 provided to shield the vehicle brakes from dust and dirt in the usual way are provided with supports 43 detachably connected thereto by suitable fastening means, for example bolts or rivets 44. If desired it is obvious that supports 43 may be welded in place. Supporting projections or ears 47 provided on supports 43 correspond to lugs 13—14 of Figures 1 to 4 and are provided with lugs 48 to act as adjustment stops for members 11—12 in the manner to be described. A boss 49, pierced or formed in any suitable manner to furnish an opening 51, provides bearing contact surfaces for the lubricated ends 52 of members 11—12 as clearly shown in the enlarged fragmentary view of Figure 6. Ends 52 are pierced to provide an opening 53 in alignment with opening 51. Suitable connecting means, as for example bolts 54 passing through apertures 51 and 53 serve to join members 11 and 12 to lugs 47 and to provide journals for turning movements of members 11 and 12. Suitable means, for example nuts 55, retain bolts 54 in place. The cheeks of boss 49 provide lateral bearing surfaces for bifurcated ends 52 of members 11 and 12 to prevent end play and twisting movements of the latter under all conditions of track operation around curves and through special work.

Screws 5 are threaded into holes in webs 57 to act as stops for projections or lugs 48 so as to fix the limits of adjustment of members 11 and 12. Nuts 58 serve as check nuts for bolts 56 to lock them from turning after the desired limits of movement of members 11 and 12 have been determined.

Adjustment of guide members 11 and 12 is accomplished by means similar to that illustrated in Figures 1 to 4. In the embodiment illustrated in Figures 5 and 6, internally threaded members 59 and 61 receive the oppositely threaded ends of rod 22 in a manner similar to that described in connection with Figures 1 to 4 for trunnions 19 and 21. Suitable means for example projections 62 may be provided to receive shanks 63 of members 59 and 61 for rotation therein. Retaining means as nuts 64 may be provided for shanks 63 to prevent disengagement of members 59 and 61 from members 11 and 12.

Rods 22 are provided with suitable means, for example squared end 23 as illustrated in Figures 1 to 4, for cooperation with a suitable tool or wrench. Members 59 and 61 have oppositely threaded bores to receive the threads of opposite pitch formed on each end of rod 22 so that upon turning of rod 22, members 11 and 12 are drawn together or spread apart in the manner fully discussed in connection with Figures 1 to 4. The range of movement of members 11 and 12, if desired, may be limited by screws 56 to suit the particular application.

Wheels 27 similar to those described in connection with Figures 1 to 4 are journaled on members 11 and 12 of the embodiment shown in Figures 5 and 6 by means of shafts 65. Suitable antifriction bearings may be provided for wheels 27 on shaft 65. Shaft 65 is provided with a reduced portion 66 received within an opening 67 in members 11 and 12. Slight lateral adjustment of wheels 27 to suit slight variations in track gauge, may be had, if desired, by means of washers 68 separating shoulder 69 of shaft 65 from the face of members 11 and 12, the degree of separation depending on the number and thickness or thicknesses of washers 68 used. Retaining means, for example nut 71 and lock washer 72, may be provided to hold shaft 65 with shoulder 69 clamping washers 67 firmly against members 11 and 12.

Members 11 and 12 are interchangeable to cooperate with any one of wheels 5 on either axle 2 or axle 3. Figure 8 is illustrative of the connection of members 44 to brake drums 42 associated with the rear or driving axle housing 2. Members 44 for cooperation with drum housings 42 of axle housing 2 are identical with those associated with axle 3.

The embodiment of Figures 5 to 8 operates on rails or highways in the manner fully disclosed and described in connection with Figures 1 to 4.

The present invention, as will be apparent from the foregoing disclosure thereof, will be seen to present a means for safe rapid transportation on rails of existing tracks, or on rails or highways or partly on rails and partly on highways in one continuous trip or trips on tires of any desired width and hence of necessary load supporting capacity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A highway and rail vehicle for operation on track rails comprising a body, axles, resiliently tired wheels supporting said axles, resilient means interconnecting said axles and frame, retractable members having means in contact with the rails during normal operation on the rails, brake drum housings on said axles, each comprising a supporting bracket to receive one of said retractable members in supporting relation, means for operating said retractable members, and a stop member on each of said brackets cooperating with adjustable means on associated retractable member to limit movement thereof.

2. A highway and rail vehicle comprising a chassis of conventional construction including a pair of unflanged pneumatic-tired dirigible wheels spaced apart to roll directly upon a pair of parallel rails as well as upon a highway surface, and further including steering mechanism of conventional design for dirigibly mounting said wheels and for manually controlling them during operation on the highway; and means for automatically controlling said wheels when they ride upon rails, said means comprising rotatable elements aligned with said dirigible wheels and therefore engageable with the rails and retractable arms interconnecting said rotatable elements with said steering mechanism to steer the dirigible wheels—whereby said vehicle operates in conventional manner on highways and in the same manner, except for automatic steering, on railroad tracks.

3. In the combination defined in claim 2, said rotatable elements comprising rollers having flanges designed to contact with the sides of the rails and having peripheral portions designed to approach the rails when changing over from highway to railway operation, said retractable arm structure being designed to maintain the bottoms of said peripheral portions a substantial distance above the horizontal plane of the bottoms of the pneumatic tires to permit the latter to cushion shocks and to carry the entire load even when slightly deflated during operation on rails.

WILLIAM B. FAGEOL.